US011812724B2

(12) United States Patent
Watson

(10) Patent No.: US 11,812,724 B2
(45) Date of Patent: Nov. 14, 2023

(54) BOTTOM-ENTRY PET-CARRYING BACKPACK

(71) Applicant: K9 Sport Sack, LLC, Orem, UT (US)

(72) Inventor: Joseph Watson, Orem, UT (US)

(73) Assignee: K9 Sport Sack, LLC, Lehi, UT (US)

( * ) Notice: Subject to any disclaimer, the term of this patent is extended or adjusted under 35 U.S.C. 154(b) by 871 days.

(21) Appl. No.: 16/547,372

(22) Filed: Aug. 21, 2019

(65) Prior Publication Data

US 2020/0060222 A1 Feb. 27, 2020

Related U.S. Application Data

(60) Provisional application No. 62/720,757, filed on Aug. 21, 2018.

(51) Int. Cl.
  *A01K 1/02* (2006.01)
  *A45F 3/04* (2006.01)
  *A45C 13/10* (2006.01)

(52) U.S. Cl.
  CPC ............. *A01K 1/029* (2013.01); *A45F 3/04* (2013.01); *A45C 13/103* (2013.01); *A45F 2003/045* (2013.01)

(58) Field of Classification Search
  CPC ........ A45F 3/04; A45F 2003/003; A45F 4/02; A45F 2003/045; A45C 7/0068; A45C 2007/0004; A45C 7/0095; A45C 13/10; A45C 13/103; A01K 1/0254; A01K 1/029
  USPC ....................................................... 119/497
  See application file for complete search history.

(56) References Cited

U.S. PATENT DOCUMENTS

| D57,526 S | 4/1921 | Hunt |
|---|---|---|
| D111,138 S | 9/1938 | Firle |
| D132,469 S | 5/1942 | Murphy |
| 2,407,787 A | 9/1946 | Kernahan |
| 3,019,952 A | 2/1962 | Brewster |
| 3,481,517 A | 12/1969 | Aukerman |
| D220,414 S | 4/1971 | Marshall |
| 4,018,369 A | 4/1977 | Jaeger |
| 4,096,978 A | 6/1978 | Noice |
| 4,194,656 A | 3/1980 | Zufich |
| 4,318,502 A | 3/1982 | Lowe |
| 4,434,920 A | 3/1984 | Moore |
| 4,884,731 A | 12/1989 | Sibley |

(Continued)

FOREIGN PATENT DOCUMENTS

| CA | 187374 S | 9/2020 |
|---|---|---|
| CA | 197855 S | 2/2022 |

(Continued)

OTHER PUBLICATIONS

International Search Report fsyrf Mar. 12, 2018, in corresponding Application No. PCT/US2017/063130.

(Continued)

*Primary Examiner* — Nathan J Newhouse
*Assistant Examiner* — Matthew T Theis
(74) *Attorney, Agent, or Firm* — TraskBritt

(57) ABSTRACT

A pet-carrying backpack is provided that includes a bag body having a carrying compartment therein, and shoulder straps attached to a front side of the bag body. A bottom-entry opening is disposed at a lower side of the bag body. The bottom-entry opening allows a bottom portion of the bag body to separate from the bag body.

8 Claims, 4 Drawing Sheets

(56) References Cited

U.S. PATENT DOCUMENTS

| | | |
|---|---|---|
| 4,923,104 A | 5/1990 | Rice et al. |
| 4,941,603 A | 7/1990 | Creamer et al. |
| D331,660 S | 12/1992 | Souhrada et al. |
| 5,176,102 A | 1/1993 | Tracy |
| 5,184,762 A | 2/1993 | Nevitt |
| D333,565 S | 3/1993 | Imbert |
| D334,253 S | 3/1993 | Balzarini |
| 5,193,486 A * | 3/1993 | Kitchens ............ A01K 1/0254 119/725 |
| 5,246,152 A | 9/1993 | Dotseth |
| D340,354 S | 10/1993 | Wrath |
| 5,297,835 A | 3/1994 | Wengler |
| 5,419,281 A | 5/1995 | Williams |
| D370,090 S | 5/1996 | Coggins |
| 5,644,902 A | 7/1997 | Kemp |
| D383,305 S | 9/1997 | Holstrom |
| 5,662,339 A | 9/1997 | Svendsen et al. |
| D392,798 S | 3/1998 | Gelb |
| 5,730,347 A | 3/1998 | Finot |
| 5,887,772 A | 3/1999 | Dooley |
| 5,934,527 A | 8/1999 | Von Neumann |
| 5,964,470 A | 10/1999 | Syendsen et al. |
| D418,972 S | 1/2000 | Gold |
| 6,202,910 B1 | 3/2001 | Swetish |
| D460,614 S | 7/2002 | Reimers et al. |
| 6,481,606 B2 | 11/2002 | Pickett |
| D472,047 S | 3/2003 | Vazquez |
| D480,843 S | 10/2003 | Sullivan |
| 6,637,367 B1 | 10/2003 | Dost et al. |
| 6,701,871 B1 | 3/2004 | Johnson |
| D552,848 S | 10/2007 | Ellerby et al. |
| D553,350 S | 10/2007 | Dvorak |
| D554,853 S | 11/2007 | Bihn |
| 7,370,608 B1 | 5/2008 | Friedman |
| D607,640 S | 1/2010 | Emile |
| D615,757 S | 5/2010 | Kostner |
| D616,611 S | 5/2010 | Lu |
| D630,427 S | 1/2011 | McGuire |
| 7,918,192 B1 | 4/2011 | Digh et al. |
| D650,576 S | 12/2011 | Bertken |
| D664,765 S | 8/2012 | Saia |
| D683,537 S | 6/2013 | Bandru |
| D692,654 S | 11/2013 | Irwin et al. |
| D693,569 S | 11/2013 | Lehan |
| D699,940 S | 2/2014 | Robert |
| D699,941 S | 2/2014 | Robert |
| D710,085 S | 8/2014 | Szewczyk |
| 9,044,080 B2 | 6/2015 | Ashenafi |
| D734,942 S | 7/2015 | Robinson et al. |
| D737,046 S | 8/2015 | Robert |
| 9,101,199 B1 | 8/2015 | Harry et al. |
| D737,568 S | 9/2015 | Robert |
| D739,653 S | 9/2015 | Majeau |
| D745,777 S | 12/2015 | Zwetzig et al. |
| D758,715 S | 6/2016 | Daniel et al. |
| D764,873 S | 8/2016 | Collie |
| D771,947 S | 11/2016 | Tong |
| D778,051 S | 2/2017 | Johnson |
| D778,595 S | 2/2017 | Zurowski |
| D779,823 S | 2/2017 | Barenbrug |
| D780,454 S | 3/2017 | Zwetzig et al. |
| D784,685 S | 4/2017 | Newson |
| D787,815 S | 5/2017 | Davison |
| D796,187 S | 9/2017 | Bogue |
| D798,043 S | 9/2017 | Sassi |
| 9,756,920 B2 | 9/2017 | Spears |
| D818,262 S | 5/2018 | Schofield |
| D819,328 S | 6/2018 | Muhlenkamp et al. |
| D822,378 S | 7/2018 | Franek |
| D824,660 S | 8/2018 | Ross |
| D828,112 S | 9/2018 | Furneaux et al. |
| D829,435 S | 10/2018 | Viger et al. |
| D849,399 S | 5/2019 | Christophe |
| 10,321,661 B2 | 6/2019 | Kath |
| D852,492 S | 7/2019 | Anderson |
| D856,661 S | 8/2019 | Lee |
| D858,977 S | 9/2019 | Owens |
| D876,081 S | 2/2020 | Dumas |
| D876,826 S | 3/2020 | Watson |
| D878,036 S | 3/2020 | Watson et al. |
| D880,952 S | 4/2020 | Mitchell et al. |
| 10,617,096 B2 * | 4/2020 | Watson ................ A45C 7/0068 |
| D885,690 S | 5/2020 | Han et al. |
| D890,515 S | 7/2020 | Oviedo Polanco |
| D893,811 S | 8/2020 | Wu |
| 10,799,003 B2 | 10/2020 | Bradley et al. |
| D904,756 S | 12/2020 | Lu |
| D908,975 S | 1/2021 | Watson |
| D909,049 S | 2/2021 | Watson |
| D910,243 S | 2/2021 | Watson |
| D915,762 S | 4/2021 | Li |
| D924,559 S | 7/2021 | Li |
| D931,600 S | 9/2021 | Huang |
| D942,142 S | 2/2022 | Mandos |
| 11,272,685 B2 * | 3/2022 | Watson ..................... A45F 3/04 |
| D970,881 S | 11/2022 | Watson |
| D970,882 S | 11/2022 | Watson |
| 11,540,487 B2 | 1/2023 | Watson |
| D979,225 S | 2/2023 | Watson |
| D982,309 S | 4/2023 | Watson |
| 2002/0074372 A1 | 6/2002 | Pickett |
| 2002/0108982 A1 | 8/2002 | Mydans |
| 2002/0124808 A1 | 9/2002 | Zampelli et al. |
| 2003/0127060 A1 | 7/2003 | Yeung |
| 2003/0205601 A1 | 11/2003 | Kilduff |
| 2005/0045674 A1 | 3/2005 | Rehbein |
| 2006/0037562 A1 | 2/2006 | Woerner |
| 2007/0012261 A1 | 1/2007 | Altieri |
| 2007/0017947 A1 | 1/2007 | Fenton |
| 2007/0278263 A1 | 12/2007 | Zak et al. |
| 2008/0054040 A1 | 3/2008 | Tanaka |
| 2008/0066689 A1 | 3/2008 | Martz |
| 2008/0149673 A1 | 6/2008 | Slater |
| 2008/0156275 A1 | 7/2008 | Lam |
| 2008/0216764 A1 | 9/2008 | Porter |
| 2009/0026241 A1 | 1/2009 | Leyendecker |
| 2009/0127299 A1 | 5/2009 | Jamlang |
| 2010/0199927 A1 | 8/2010 | Cigard et al. |
| 2011/0083933 A1 | 4/2011 | Engel |
| 2011/0278337 A1 | 11/2011 | Chiu |
| 2011/0278338 A1 | 11/2011 | Darnell, II et al. |
| 2011/0284608 A1 | 11/2011 | Staudecker et al. |
| 2012/0006865 A1 | 1/2012 | Su |
| 2013/0221051 A1 | 8/2013 | Hairston et al. |
| 2014/0060453 A1 * | 3/2014 | Shewfelt ............ A01K 27/002 119/770 |
| 2015/0374139 A1 | 12/2015 | Salazar et al. |
| 2016/0015003 A1 | 1/2016 | Watson et al. |
| 2016/0227730 A1 | 8/2016 | Rivera |
| 2017/0172102 A1 | 6/2017 | Rivera |
| 2017/0215385 A1 | 8/2017 | Hansen et al. |
| 2018/0139921 A1 | 5/2018 | Kath |
| 2018/0139922 A1 | 5/2018 | Watson |
| 2018/0154203 A1 | 6/2018 | Schromm |
| 2018/0228120 A1 | 8/2018 | Laicheng |
| 2019/0254400 A1 | 8/2019 | Challa |
| 2020/0029533 A1 | 1/2020 | Badr |
| 2020/0060222 A1 | 2/2020 | Watson |
| 2020/0100469 A1 | 4/2020 | Elam |
| 2022/0015328 A1 | 1/2022 | Ross |
| 2022/0061263 A1 | 3/2022 | Watson |
| 2023/0232783 A1 | 7/2023 | Wang |

FOREIGN PATENT DOCUMENTS

| | | |
|---|---|---|
| CN | 201005216 | 1/2008 |
| CN | 201005216 Y * | 1/2008 |
| CN | 202535860 | 11/2012 |
| CN | 203353366 U | 12/2013 |
| CN | 303221063 | 5/2015 |
| CN | 303342928 | 8/2015 |
| CN | 204733728 | 11/2015 |
| CN | 304021795 | 2/2017 |
| CN | 206150107 U | 5/2017 |

(56) References Cited

FOREIGN PATENT DOCUMENTS

| | | | |
|---|---|---|---|
| CN | 304922920 S | 12/2018 | |
| CN | 305122160 | 4/2019 | |
| CN | 209268299 U | 8/2019 | |
| CN | 306365217 | 3/2021 | |
| DE | 202011102300 U1 | 1/2012 | |
| DE | 202014007394 | 4/2015 | |
| EM | 000042999-0004 | 6/2003 | |
| EM | 006395372-0001 | 4/2019 | |
| EM | 006395372-0002 | 4/2019 | |
| FR | 2668044 | 4/1992 | |
| GB | 2436735 A | 10/2007 | |
| GB | 6016752 | 8/2017 | |
| GB | 9006395372-0002 | 4/2019 | |
| GB | 6128720 | 4/2021 | |
| IN | 298348-0001 | 6/2019 | |
| JP | 03-167159 A | 7/1991 | |
| JP | 05-046264 | 6/1993 | |
| JP | 2000-287574 | 10/2000 | |
| JP | 3167159 U | 4/2011 | |
| JP | 1609184 S | 7/2018 | |
| JP | 1621362 S | 1/2019 | |
| KR | 20-0335245 | 12/2003 | |
| KR | 30-0640-7780000 | 4/2012 | |
| KR | 10-1525981 | 6/2015 | |
| KR | 101535826 B1 * | 7/2015 | ............... A45F 3/04 |
| KR | 300823841.0000 | 11/2015 | |
| KR | 10-2019-0056722 A | 5/2019 | |
| KR | 30-1051144 | 3/2020 | |
| KR | 301136355.0000 | 11/2021 | |
| RU | 00084313 | 2/2013 | |
| RU | 00127653 | 9/2021 | |
| SG | 20141329F-0001 | 12/2014 | |
| TW | M444711 U | 1/2013 | |
| TW | M514722 U | 1/2016 | |
| TW | D180162 S | 12/2016 | |
| TW | D182034 S | 4/2017 | |
| TW | D190435 S | 5/2017 | |
| TW | D194326 | 12/2018 | |
| WO | 97/37529 A1 | 10/1997 | |
| WO | 2008/153252 A1 | 12/2008 | |
| WO | WO-2016096150 A1 | 6/2019 | |

OTHER PUBLICATIONS

K9 Sport Sack: Because Dogs Just Wanna to Have Fun! posted at missmollysays.com, posted on Feb. 26, 2017, online, URL: https://missmol lysays .com/k9-sport-sack-because-dogs-just-wanna-have-fun/ (Year: 2017).

K9 Sport Sack, posted at www.bonesps.com, no posting date available, online, URL:https://www.bonesps.com/collections/vendors?q=K9%20Sport%20Sack (Year: 2018).

JPO Ref. No. HB08021181, Outside, 9th, vol. 21, p. 150, Sep. 30, 1996, 1 page.

JPO Ref. No. HH13021686, S Design Gazette (DE), Nov. 10, 2000, 1 page.

JPO Ref. No. HA13021582, Tokusengai, 1st, vol. 24, p. 175, Jan. 1, 2002, 1 page.

JPO Ref. No. HC14042642, General Catalog, E-Motion, p. 28, JPO documented on Sep. 27, 2002, 1 page.

JPO Ref. No. HC15040837, Adventure Travel, The North Face Catalog Fall & Winter 2003-2004, p. 53, JPO documented on Oct. 24, 2003, 1 page.

JPO Notification of List of References for JP Design Registration Application No. 2018-020511.

Amazon, "K9 Sport Sack 1 Dog Carrier Backpack for Small and Medium Pets . . . ", First review Jan. 4, 2016. (https://www.amazon.coM/dp/B07HZ6BVQ4?th=1) (Year: 2016).

Extended European Search Report dated Jun. 17, 2020 in corresponding Application No. EP7874238.3.

International Search Report issued for PCT/US2019/0475621 dated Dec. 4, 2019, 3 pages.

Ytonet Pet Carrier Bsackpack, available at amazon.com, earliest date available Nov. 30, 2018 [online], site visited Dec. 9, 2021, Available from the internet URL: https://www.amazon.com/dp/B07FY 4561Q?th=1 (Year: 2018).

K9 Sport Sack Evolution, available at youtube.com, posted May 22, 2020 [online], site visited Dec. 9, 2021, Available from the internet URL: https://www.youtube.com/watch?v=zGWK70RMVQM (Year: 2020).

Backpack, walmart.com, date not available [online], site visited Dec. 9, 2021, Available from the internet URL: https://www.walmart.com/ip/Anself-Pet-Backpack-Dog-Cat-Carrier-Double-Zip-Clear-Window-Side-Pockets-Travel-Shoulder-Bag-Open-Doors-Comfortable-Travelling-Hiking-Outdoor-Use/397323749.

K9 Sport Sack Air 2, available at k9sportsack.com, earliest customer review date Feb. 24, 2020 [online], site visited Dec. 9, 2021, Available from the internet URL: https://www.k9sportsack.com/products/air-2 (Year: 2020).

K9 Sport Sack Post, available at facebook.com, posted Sep. 3, 2019 [online], site visited Dec. 9, 2021, Available from the internet URL: https://www.facebook.com/k9sportsackusa/photos/a.1908221172781963/242707 4830896592/?type=3 (Year: 2019).

K9 Sport Sack Post, available at facebook.com, posted Mar. 1, 2020 [online], site visited Dec. 9, 2021, Available from the internet URL: https://www.facebook.com/k9sportsackusa/photos/a.1908221172781963/2585534958383911/?type=3 (Year: 2020).

Pets Carrier Backpack, available at nxills.com, date not available [online], site visited Dec. 9, 2021, Available from the internet URL: https://www.nxills.com/index.php?main_page=product_info&products_id =794974.

K9 Sport Sack Post, available at facebook.com, posted Jun. 1, 2018 [online], site visited Dec. 9, 2021, Available from the internet URL: https://www.facebook.com/k9sportsackusa/photos/a.1606811192922964/2095610264043052/?type=3 (Year: 2018).

WOYYHO Pet Dog Carrier Backpack, available at amazon.com, earliest date available Oct. 17, 2020 [online], site visited Dec. 9, 2021, Available from the internet URL: https://www.amazon.com/dp/B08L7RFYXG?tag=upgrapoint-20&linkCode=ogi&th=1 (Year: 2020).

Kurgo G-Train Backpack, available at chewy.com, earliest customer review date May 14, 2019 [online], site visited Dec. 9, 2021, Available from the internet URL: https://www.chewy.com/kurgo-g-train-airline-approved-dog/dp/190589? (Year: 2019).

Herkey the Cavalier's K9 Sport Sack Adventure 2019, available at youtube.com, posted Apr. 25, 2019 [online], site visited Dec. 9, 2021, Available from the internet URL: https://www.youtube.com/watch?v=wxGI Ls-Dsi E (Year: 2019).

K9 Sport Sack Trainer, available at amazon.com, earliest customer question date Dec. 1, 2019 [online], site visited Dec. 9, 2021, Available from the internet URL: https://www.amazon.com/K9-Sport-Sack-Adjustable-Veterinarian/dp/B07XYK9N3G?th=1 (Year: 2019).

PawRoll Dog Carrier Backpack, available at pawroll.com, earliest customer review date Jan. 26, 2018 [online], site visited Dec. 9, 2021, Available from the internet URL: https://pawroll.com/products/pawroll-dog-backpack-carrier? (Year: 2018).

K9 Sport Sack Trainer, available at k9sportsack.com, earliest customer review date Jan. 2, 2020 [online], site visited Dec. 9, 2021, Available from the internet URL: https://www.k9sportsack.com/products/k9-sport-sack-trainer (Year: 2020).

Outward Hound Carrier, available at amazon.com, earliest date available Apr. 30, 2012 [online], site visited Dec. 9, 2021, Available from the internet URL: https://www.amazon.com/Outward-Hound-Pooch-Pouch-Carrier-Backpack/dp/80081 XIJ9M? (Year: 2012).

K9 Sport Sack Air Trainer, available at petco.com, date not available [online], site visited Dec. 9, 2021, Available from the internet URL: https ://www.petco.com/shop/en/petcostore/product/k9-sport-sack-air-trainer-green-backpack-pet-carrier-12-1-x-11-w-x-22-h-3161467?.

K9 Sport Sack: Unique Dog Transportation Bag, available at www.kickstarter.com, posted Apr. 26, 2013 [online], available from the Internet URL: https://www.kickstarter.com/projects/1034052737/k9-sport-sack-unique-dog-transportation-bag?ref=discovery&term=k9%20sport%20sack.

(56) References Cited

OTHER PUBLICATIONS

Ruffit Dog Carrier, available at amazon.com, earliest customer review Dec. 12, 2017 [online], site visited Apr. 20, 2022.
K9 Sport Sack Knavigate, available at k9sportsack.com, earliest customer review date Dec. 15, 2020 [online], site visited Dec. 9, 2021, Available from the internet URL: https://www.k9sportsack.com/products/k9-sport-sack-knavigate (Year: 2020).
K9 Sport Sack Post, available at facebook.com, posted Dec. 29, 2018 [online], site visited Dec. 9, 2021, Available from the internet URL: https://www.facebook.com/k9sportsackusa/photos/a.1908221172781963/2262498034020940/?type=3 (Year: 2018).
The All New KNAVIGATE, available at youtube.com, posted Dec. 1, 2020 [online], site visited Dec. 9, 2021, Available from the internet URL: https://www.youtube.com/watch?v=hfKOryG2z4o (Year: 2020).
Tirrinia Large Pet Backpack, available at amazon.com, earliest date available Nov. 30, 2018 [online], site visited Dec. 9, 2021, Available from the internet URL: https://www.amazon.com/gp/product/B0797DGZ38/?th=1 (Year: 2018).
WLDOCA Dog Carrier Backpack, available at amazon.com, earliest date available Mar. 14, 2019 [online], site visited Dec. 9, 2021, Available from the internet URL: https://www.amazon.com/WLDOCA-Carrier-Backpack-Adjustable-Motorcycle/dp/B08KVXPTHR?th=1 (Year: 2019).
International Search Report for International Application No. PCT/US2021/048299 dated Nov. 29, 2021, 10 pages.
International Search Report for International Application No. PCT/US2022/012588 dated Apr. 22, 2022, 12 pages.
Extended European Search Report dated Apr. 7, 2022; in EP Application No. 19851294.9 filed Aug. 21, 2019; 9 pages.
Bushcraft USA Forums, Mystery Ranch Comparison—*Sweet Pea vs. the 3 Day Assault Pack*, https://web.archive.org/web/20160926234313/http://bushcraftusa.com:80/forum/threads/mystery-ranch-comparison-sweet-pea-vs-the-3-day-assault-pack.93311/, Sep. 8, 2016, 14 pages.
Gear Lab Reviews, Eagle Creek Deviate 60 Review | Tested by GearLab, https://www.outdoorgearlab.com/reviews/travel/travel-backpack/eagle-creek-deviate-60, (Jun. 8, 2015, 5 pages.
Gear Lab, Deuter Quantum 70+10 Review, https://www.outdoorgearlab.com/reviews/travel/travel-backpack/deuter-quantum-70-plus-10, (Jun. 8, 2015), 5 pages.
Gossamer Gear Mariposa 60 Backpack, available at youtube.com, posted Mar. 29, 2022 [online], site visited Apr. 27, 2022, available from the internet URL: https://www.youtube.com/walch?v=pbzkBVvXAIA (Year: 2022).
K9 Sport Sack, The World's Most Unique Dog Bag Carrier K9 Sport Sack 2, , https://web.archive.org/web/20150521040634/http://www.k9sportsack.com:80/, (Jan. 7, 2012), 3 pages.
Osprey Aether 55 Pack, available at moosejaw.com, earliest customer review date Apr. 2021 [online], site visited Apr. 27, 2022, available from the internet URL: https://www.moosejaw.com/producl/osprey-aether-55-pack_10499354? (Year: 2021).
Ozark Trail 45 ltr Backpacking Backpack, available at walmart.com, earliest customer review date Nov. 17, 2019 [online], site visited Apr. 27, 2022, available from the internet URL: https://www.walmart.com/ip/Ozark-Trail-45-Itr-Backpacking-Backpack-Gray/565060930 (Year: 2019).
Rover 2 | Big Dog Carrier & Backpacking Pack, available at k9sportsack.com, earliest customer review date Feb. 3, 2021 [online], site visited Apr. 27, 2022, available from the internet URL: https://www.k9sportsack.com/products/rover-2-dog-carrier-backpacking-pack (Year: 2021).
Ruffit, First Front Facing Dog Carrier, https://web.archive.org/web/20161006020255/http:/ruffitusa.com/, (Mar. 12, 2015), 4 pages.
Tough Traveler, Dog Perch Backpack, Gear Lab Reviews, Eagle Creek Deviate 60 Review | Tested by GearLab, https://web.archive.org/web/20160315204426/http://www.toughtraveler.com/dogbags.asp, (Jun. 8, 2015, 5 pages, (Oct. 28, 2004), 5 pages.
Youtube, "K9 Sport Sack Rover Dog Backpack Carrier Review and Testing", Posted by "Top Dog Tips" on Sep. 8, 2019. (https://www.youtube.com/watch?v=3ISHSi09L5M) (Year: 2019).
K9 Sport Sack Walk-On, posted at amazon.com, first available Aug. 18, 2020, retrieved on May 10, 2023, online, https://www.amazon.com/K9-Sport-Sack-Carrier-Backpack/dp/B09S5RXPLG (Year: 2020).
Knavigate, posted at k9sportsack.com, first available Dec. 15, 2020, retrieved on May 10, 2023, online, https://www.k9sportsack.com/products/k9-sport-sack-knavigate?variant=32040903180346 (Year: 2020).
Walk-on with harness & storage, posted atk9sportsack.com, first available Feb. 14, 2022, retrieved on May 10, 2023, online, https://www.k9sportsack.com/collections/dog-carriers/products/walk-on-with-harness-storage?variant=39529235316794 (Year: 2022).

\* cited by examiner

BOTTOM-ENTRY PET-CARRYING BACKPACK

CROSS-REFERENCE TO RELATED APPLICATION

This application claims priority to U.S. Provisional Application No. 62/720,757, which was filed on Aug. 21, 2018, the contents of which are hereby incorporated by reference.

BACKGROUND

The disclosed embodiments relate to carrying bags and backpacks. More specifically, the disclosed embodiments relate to pet-carrying backpacks.

Many people enjoy keeping pets for the companionship, help, and/or friendship that they provide. Pets, of course, require substantial time and attention from their owners to ensure that they are well cared for. Sometimes, pet owners would like to travel, hike, or participate in other activities of which their pets are not capable due to the pet's size, age, or various health issues. Many pet owners also prefer not to leave their pets in the care of friends or commercial pet care facilities while participating in such activities. Accordingly, such pet owners are in need of a solution that allows them to participate in activities they find enjoyable while being able to bring along their pet companions that may not otherwise be capable of joining with them.

SUMMARY

A pet-carrying backpack is provided that includes a bag body having a carrying compartment therein, and shoulder straps attached to a front side of the bag body. A bottom-entry opening is disposed at a lower side of the bag body. The bottom-entry opening allows a bottom portion of the bag body to separate from the bag body.

In some embodiments, the bottom-entry opening separates the bottom portion of the bag body at both sides of the bag body and at a rear of the bag body. The pet-carrying backpack may further comprise a back-support opening disposed on a rear side of the bag body. The back-support opening may include a zipper opening that extends vertically along the rear side of the bag body from an upper end. Pet back-support straps may extend across the zipper opening to releasably connect to one another.

In one embodiment, the pet-carrying backpack may include paw holes disposed on an upper portion of the front side of the bag body. A collar strap may be disposed at an upper end of the bag body. The collar strap serves to adjust a size of an opening of the upper end. The pet-carrying backpack may include closeable side vents disposed on sides of the bag body and accessory fasteners configured to attach one or more accessories to the bag body.

In another exemplary embodiment, a pet-carrying backpack includes a bag body having a carrying compartment therein, shoulder straps attached to a front side of the bag body, paw holes disposed on an upper portion of the front side of the bag body above the shoulder straps, and a bottom-entry opening. The bottom-entry opening is disposed at a lower side of the bag body and allows a bottom portion of the bag body to separate from the bag body to provide access into the carrying compartment from the bottom-entry opening.

In some embodiments, bottom-entry opening separates the bottom portion of the bag body at both sides of the bag body and at a rear of the bag body. The bottom-entry opening may be detachable via a zipper. The backpack may also include a back-support opening disposed on the rear of the bag body. The back-support opening may be a zipper opening that extends vertically along the rear of the bag body from an upper end.

In one embodiment, pet back-support straps may extend across the zipper opening to releasably connect to one another. A collar strap may be included at an upper end of the bag body that adjusts a size of an opening of the upper end. Closeable side vents may be provided on sides of the bag body, and accessory fasteners may be configured to attach one or more accessories to the bag body.

A method of loading a pet into a pet-carrying backpack is also provided. The method including leading a pet through a bottom-entry opening disposed at a lower side of a bag body of a pet-carrying backpack, the bottom-entry opening allowing a bottom portion of the bag body to separate from the bag body; leading front paws of the pet through paw holes disposed in a front side of the bag body; and closing the pet within the bag body by closing the bottom-entry opening and a back-support opening disposed on a rear side of the pet-carrying backpack.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

Figure 1:
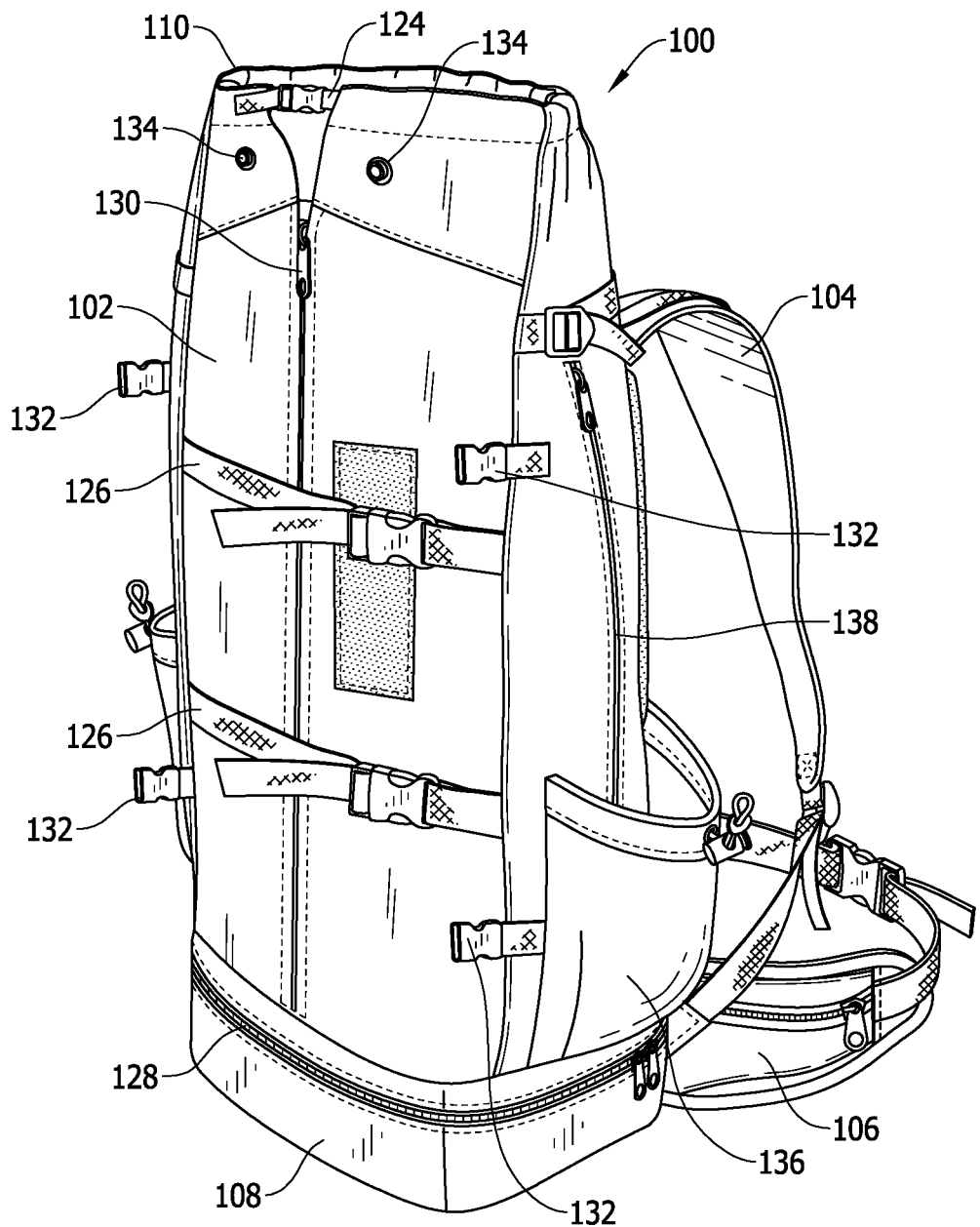
FIG. 1 is a perspective view of a bottom-entry pet-carrying backpack, according to one exemplary embodiment.

FIG. 1 is a perspective view of a bottom-entry pet-carrying backpack, according to one exemplary embodiment. A bottom-entry pet-carrying backpack 100 is provided and is configured to allow a user to easily transport a pet, such as a dog. The pet-carrying backpack may include several features in different embodiments, such as those more particularly described in U.S. Patent Application Publication No. 2018/0139922, the contents of which are hereby incorporated by reference.

In this embodiment, the bottom-entry pet-carrying backpack 100 is comprised of a bag body 102 (also referred to herein as "backpack body 102"), shoulder straps 104 attached to the bag body 102, and waist straps 106 attached to the bag body 102. The bag body 102 defines a carrying compartment in which the pet may be carried. The bag body 102 has a lower end 108 in which a pet is supported while sitting or being hunched on its hind legs within the compartment of the bag body 102. For example, the lower end 108 may include a platform formed by an internal frame part and padding (not shown). This provides a stable seat within the bag body 102 for the pet. The bag body 102 has an upper end 110. The upper end 110 is configured to be open so that the head of the pet may extend therethrough.

Figure 2:
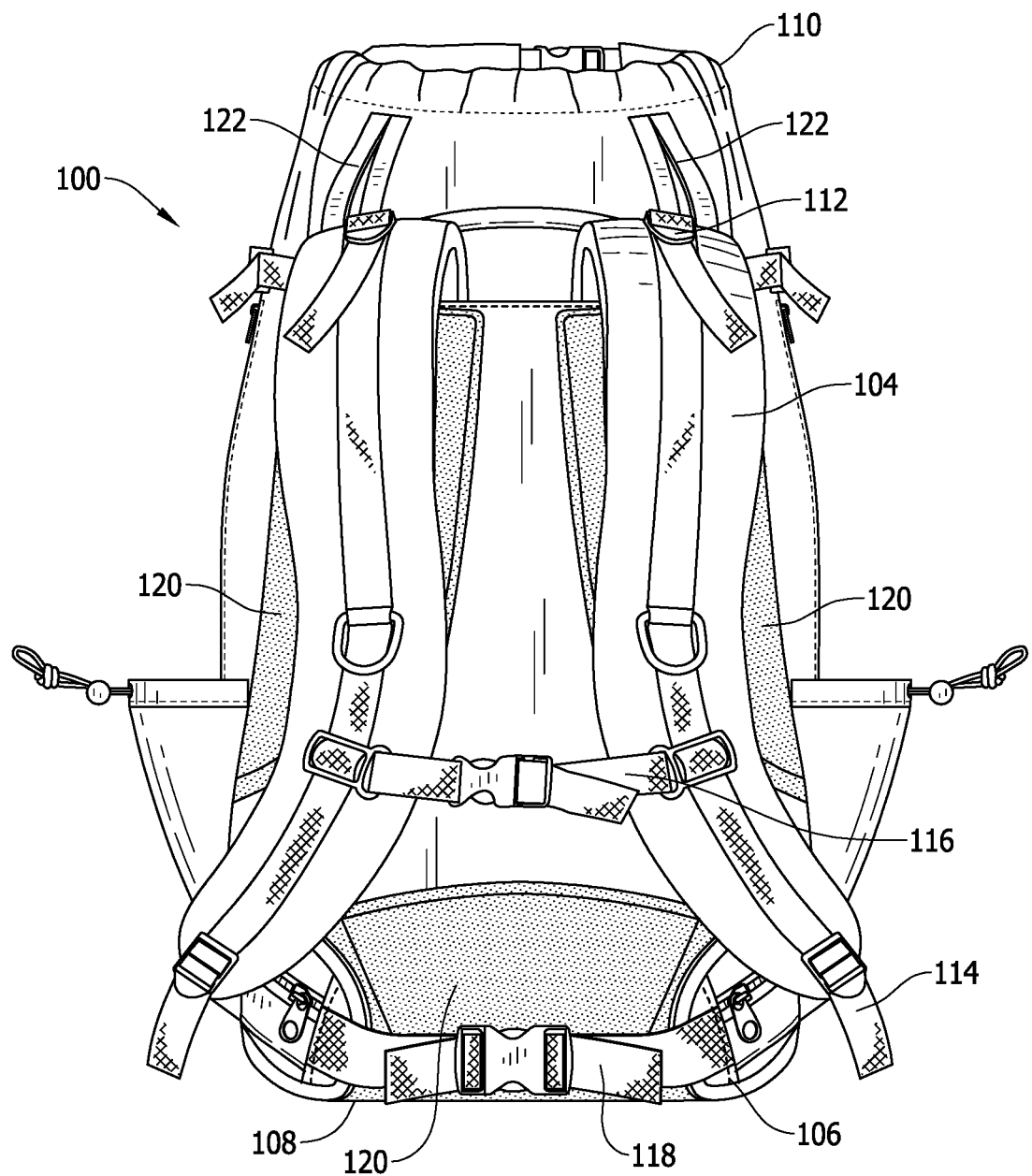
FIG. 2 is a front view of the bottom-entry pet-carrying backpack of FIG. 1.

FIG. 2 is a front view of the bottom-entry pet-carrying backpack of FIG. 1. As shown in FIG. 2, the shoulder straps 104 may include upper adjustment straps 112 and lower adjustment straps 114 to adjust the fit of the straps around the shoulders of the user. This allows the user to distribute the weight on the user's body so that the backpack 100 will rest at a comfortable position on the user. A sternum strap 116 is attached to the shoulder straps 104 to comfortably hold the shoulder straps 104 in place during use.

The waist straps 106 similarly comprise one or more adjustment straps 118 to adjust the size of the waist straps 106. This helps the user load the weight of the backpack 100 onto his/her hips to facilitate easier carrying of the backpack 100 and any pet riding therein.

The backpack body 102 may comprise an internal frame that extends from the lower end 108 of the backpack body 102 toward the upper end 110. The frame provides added structure and stability to the backpack 100. Raised padding 120 may be provided along a front side of the backpack. Combined with the internal frame, the raised padding 120 distances the backpack body 102 from the user to allow ventilation between the user and the backpack body 102.

Near the upper end 110 of the backpack body 102, paw holes 122 are provided. The paw holes 122 help the pet feel secure and comfortable in the backpack and provide a connection between the pet and the user. This also allows the pet to face forward (the same direction as the user) so that the pet has a good view of its surroundings, of its heading, and of the user carrying it.

Returning to FIG. 1, the upper end 110 of the backpack body 102 comprises a collar strap 124. This secures the pet within the backpack 100 and provides support to the pet's neck and back by controlling the size of the opening of the upper end 110 of the backpack 100. Back-support straps 126 extend across the back of the backpack body 102 to help shape and support the backpack body 102 to securely hold the pet therein and provide support to the lumbar of the pet.

In this embodiment, the backpack body 102 includes a bottom-entry opening 128 that may be opened and shut via a zipper or other fastener. Especially with larger pets, it may be difficult for a user to pick up and load the pet into the backpack body 102 so that the pet may be carried in the backpack 100. Thus, the bottom-entry opening 128 is provided to allow the pet to easily enter the backpack body 102. To further ease loading and unloading, a back-support opening 130 is provided. The back-support opening 130 runs vertically from the upper end 110 to a position adjacent to the bottom-entry opening 128. The back-support opening 130 may be opened and closed via a zipper or other fastener.

The backpack 100 may include other features such as accessory fasteners 132 and snaps 134. Other accessories such as clip-on bags or other equipment may be attached to the backpack 100 via the accessory fasteners 132. Similarly, rain hoods, sunshades, or other accessories may be added to the backpack via the snaps 134. Side pockets 136 may also be provided to hold water bottles or other similarly shaped objects. Ventilation openings 138 may be included to control air entry into and out of the bag body 102 to increase the comfort of the pet. The ventilation openings 138 in this embodiment are opened and closed via a zipper. However, other fasteners may be used. A mesh lining may be provided on the sides of the bag body 102 to allow ventilation when the ventilation openings 138 are opened. A portion or all of the inside of the backpack body 102 may be lined with temperature regulating fabric, such as that sold under the OUTLAST® trade name.

Figure 3:
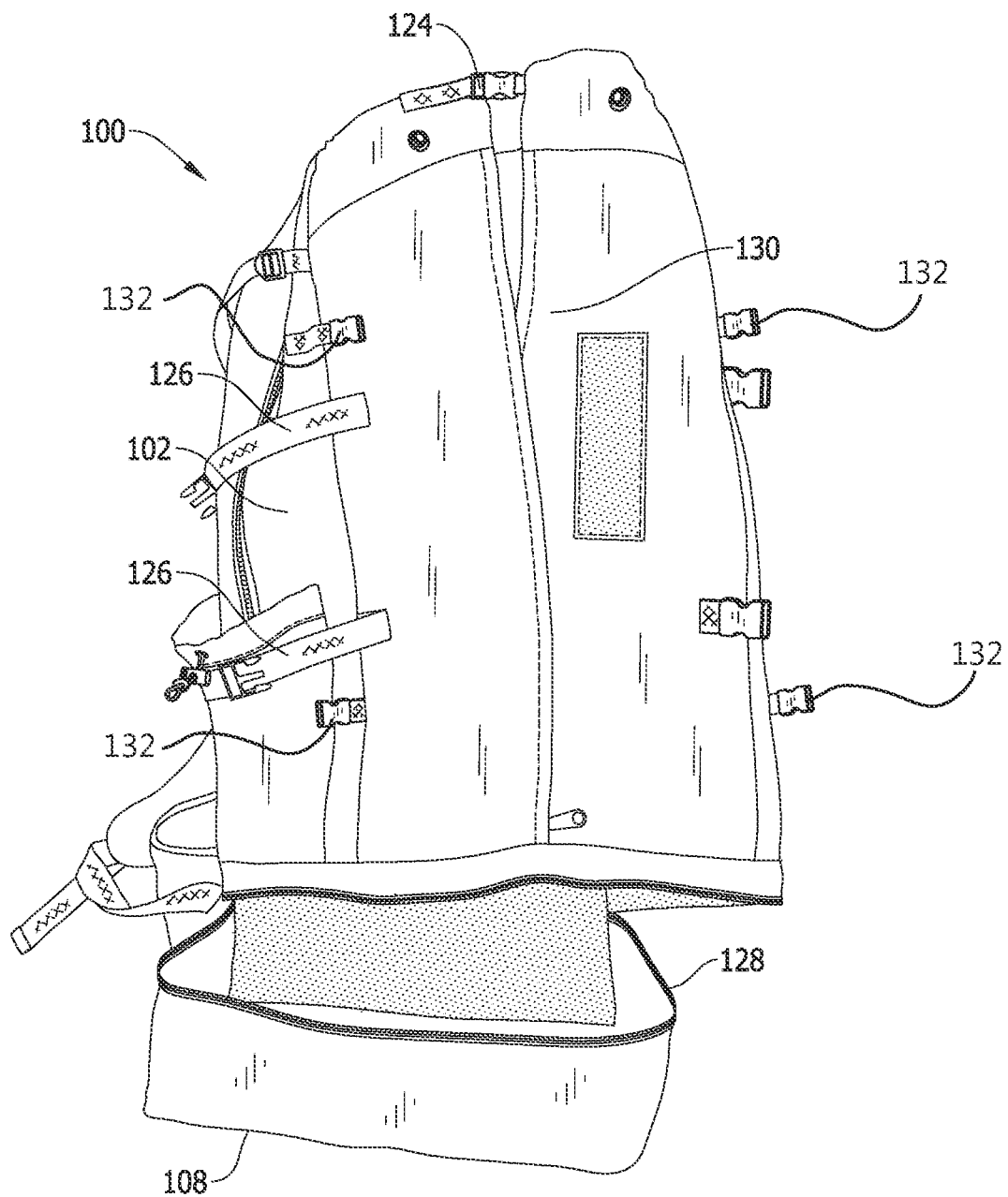
FIG. 3 is a view of the bottom-entry pet-carrying backpack in a loading configuration, according to one exemplary embodiment.

FIG. 3 is a view of the bottom-entry pet-carrying backpack in a loading configuration, according to one exemplary embodiment. As mentioned above, the bottom-entry pet-carrying backpack 100 allows a pet to enter the backpack body to allow easy loading of the pet. This is especially helpful for larger animals, such as larger breeds of dogs. The backpack may be placed so that the front of the backpack 100 is front-side down (that is, the side with the shoulder straps is placed on the ground). The bottom-entry opening 128 is configured to separate the lower end 108 from the bag body 102 such that the lower end 108 of the bag body 102 is rotatable away from the bag body 102. In this embodiment, the bottom-entry opening 128 detaches from the lower end 108 along both sides and the rear of the bag body 102. The back-support straps 126 and back-support opening 130 may each be unbuckled and unzipped, respectively, to allow easy ingress to the bag body 102. In this configuration, a pet, such as a dog, may easily crawl into the bag body 102 via the bottom-entry opening 128.

Figure 4:
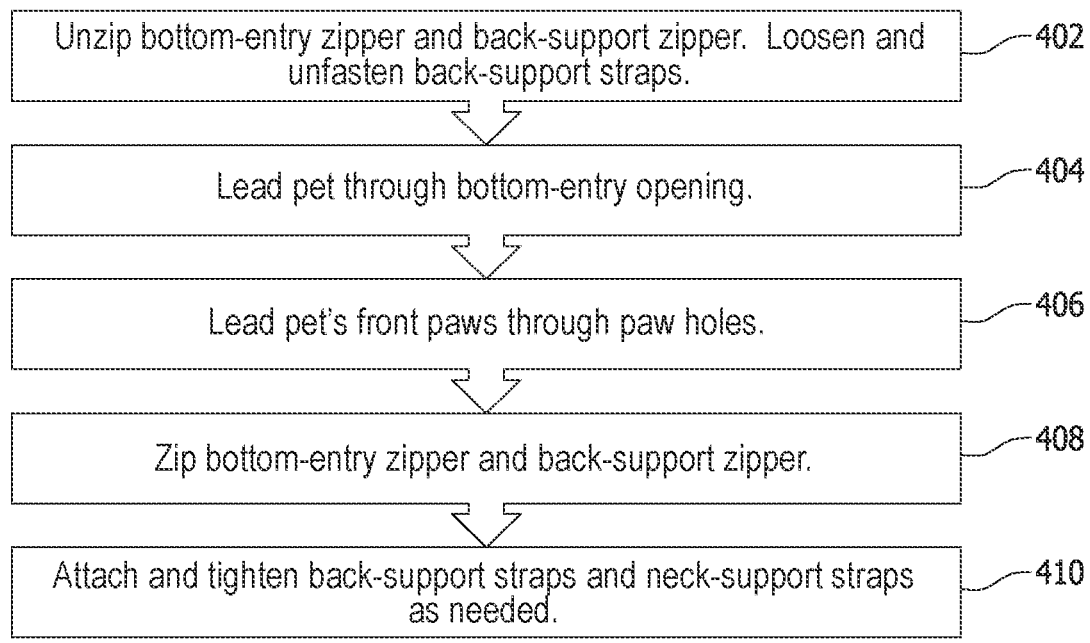
FIG. 4 shows a method of loading a bottom-entry pet-carrying backpack, according to one exemplary embodiment.

FIG. 4 shows a method of loading a bottom-entry pet-carrying backpack, according to one exemplary embodiment. In step 402, the user unzips the bottom-entry zipper and back-support zipper. The user also loosens and unfastens the back-support straps to prepare the bag for loading. In step 404, the user leads the pet through the bottom-entry opening and into the bag body. Referring to FIG. 3, the pet is led into the bottom-entry opening 128. The task is made easier due to the zipper of back-support opening 130 and back-support straps 126 being open.

Returning to FIG. 4, in step 406, the user leads the pet's front paws into through the paw holes. Referring to FIG. 2, the user helps the pet place the front paws into and through the paw holes 122. In step 408 (FIG. 4), with the pet in position in the bag body 102, the user zips the bottom-entry opening and the back-support zipper. This secures the pet in the bag so that the pet cannot fall out. In step 410, the user attaches and tightens the back-support straps 126 and the collar strap 124 as needed to support the pet within the bag. Once the bag is loaded with the pet, the user can wear the backpack with the pet therein.

In some embodiments, once the pet is loaded, the user may clip a leash attaching to a pet collar to a clip on the interior of the bag. This further helps to train the pet to sit in the bag. Of course, the bag may also be loaded with a pet without using the bottom-entry opening 128, such as by loading the pet from the upper end 110 with the zipper of back-support opening 130 open, or by having the pet lie down in the back with the zipper of back-support opening 130 open.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method of loading a pet into a pet-carrying backpack, the method comprising:
   leading a pet through a bottom-entry opening disposed at a lower side of a bag body of a pet-carrying backpack, the bottom-entry opening allowing a bottom portion of the bag body to separate from the bag body;
   leading front paws of the pet through paw holes disposed in a front side of the bag body; and closing the pet within the bag body by closing the bottom-entry opening and a back-support opening disposed on a rear side of the pet-carrying backpack.

2. The method of claim 1, wherein the bottom-entry opening separates the bottom portion of the bag body at both sides of the bag body and at a rear of the bag body.

3. The method of claim 1, wherein the back-support opening comprises a back zipper opening that extends vertically along the rear side of the bag body from an upper end, and wherein closing the pet within the bag body comprises closing the back zipper opening.

4. The method of claim 3, wherein the pet-carrying backpack comprises pet back-support straps that extend across the back zipper opening to releasably connect to one another, and wherein closing the pet within the bag body comprises connecting the pet back-support straps.

5. The method of claim 1, further comprising adjusting a collar strap disposed at an upper end of the bag body that adjusts a size of an opening of the upper end.

6. The method of claim 1, wherein the pet-carrying backpack comprises closeable side vents disposed on sides of the bag body.

7. The method of claim 1, wherein the pet-carrying backpack comprises accessory fasteners configured to attach one or more accessories to the bag body.

8. The method of claim 1, wherein the pet-carrying backpack comprises at least one contouring strap operable to shape the bag body to securely hold the pet therein.

* * * * *